_United States Patent_ [19]

Suga et al.

[11] Patent Number: 4,645,797

[45] Date of Patent: Feb. 24, 1987

[54] 3-METHYLBUTENE-1 POLYMER COMPOSITION AND PROCESS FOR ITS PRODUCTION

[75] Inventors: Yoshinori Suga, Tokyo; Eiji Tanaka, Kawasaki; Nobuo Enokido, Sagamihara; Yasuo Maruyama, Tokyo, all of Japan

[73] Assignee: Mitsubishi Chemical Industries Ltd., Tokyo, Japan

[21] Appl. No.: 835,112

[22] PCT Filed: Jun. 18, 1985

[86] PCT No.: PCT/JP85/00344

§ 371 Date: Feb. 24, 1986

§ 102(e) Date: Feb. 24, 1986

[87] PCT Pub. No.: WO86/00316

PCT Pub. Date: Jan. 16, 1986

[30] Foreign Application Priority Data

Jun. 22, 1984 [JP] Japan ........................ 59-128482

[51] Int. Cl.$^4$ .................. C08L 23/20; C08L 53/00
[52] U.S. Cl. ........................... 525/191; 525/240; 525/247; 525/268; 525/320; 525/321; 526/348.6
[58] Field of Search ............... 525/191, 321, 240, 247

[56] References Cited

U.S. PATENT DOCUMENTS

| | | | |
|---|---|---|---|
| 3,544,662 | 12/1970 | Polestak et al. | 525/240 |
| 3,692,712 | 9/1972 | Crouch et al. | 525/191 |
| 4,146,591 | 3/1979 | Fukui et al. | 525/321 |
| 4,454,306 | 6/1984 | Fujii et al. | 525/321 |

FOREIGN PATENT DOCUMENTS

| | | | |
|---|---|---|---|
| 182305 | 11/1982 | Japan . | |
| 195704 | 12/1982 | Japan . | |
| 8708 | 1/1983 | Japan . | |
| 59-157106 | 9/1984 | Japan | 525/321 |

_Primary Examiner_—Carman J. Seccuro
_Attorney, Agent, or Firm_—Oblon, Fisher, Spivak, McClelland & Maier

[57] ABSTRACT

A 3-methylbutene-1 polymer composition comprising from 10 to 95% by weight of a 3-methylbutene-1 homopolymer, or a copolymer of 3-methylbutene-1 with other α-olefin having from 2 to 12 carbon atoms, which has a 3-methylbutene-1 content of higher than 90% by weight, and from 5 to 90% by weight of a copolymer of 3-methylbutene-1 with other α-olefin having from 2 to 12 carbon atoms, which has a 3-methylbutene-1 content of from 40 to 90% by weight, and a process for its production.

7 Claims, No Drawings

3-METHYLBUTENE-1 POLYMER COMPOSITION AND PROCESS FOR ITS PRODUCTION

TECHNICAL FIELD

The present invention relates to a 3-methylbutene-1 polymer composition having excellent heat resistance, stretchability and mechanical strength of the molded product, such as tear strength and impact strength, and a process for its production.

BACKGROUND ART 3-methylbutene-1 polymers (also called 3-methyl-1-butene polymers) have been known as crystalline polyolefins having high melting points. For instance, Japanese Unexamined Patent Publications No. 182305/1982, No. 195704/1982 and No. 8708/1983 disclose processes wherein 3-methylbutene-1 is polymerized by means of titanium trichloride having a small aluminum content and an organoaluminum compound. While 3-methylbutene-1 polymers obtained by these conventional processes have high melting points, the mechanical strength of the molded products such as tear strength or impact strength and the stretchability are inadequate. Therefore, such products are not necessarily satisfactory as materials for various molded products or as materials for stretched or non-stretched films.

The present inventors have conducted extensive studies with an aim to overcome the above-mentioned various drawbacks, i.e. to improve the stretchability and the mechanical strength of the molded product, without impairing the heat resistance as the feature of 3-methylbutene-1 polymers. As a result, they have arrived at the present invention. Heretofore, such a 3-methylbutene-1 polymer composition and the process for its production have not been known.

DISCLOSURE OF THE INVENTION

The present invention provides a 3-methylbutene-1 polymer composition comprising from 10 to 95% by weight of a 3-methylbutene-1 homopolymer, or a copolymer of 3-methylbutene-1 with other α-olefin having from 2 to 12 carbon atoms, which has a 3-methylbutene-1 content of higher than 90% by weight, and from 5 to 90% by weight of a copolymer of 3-methylbutene-1 with other α-olefin having from 2 to 12 carbon atoms, which has a 3-methylbutene-1 content of from 40 to 90% by weight; and a process for producing a 3-methylbutene-1 polymer composition which comprises, in the presence of a transition metal compound and an organometallic compound of a metal of Groups 1 to 3 of the periodic table, polymerizing 3-methylbutene-1, or 3-methylbutene-1 and other α-olefin having from 2 to 12 carbon atoms, to form a polymer or copolymer having a 3-methylbutene-1 content of higher than 90% by weight in an amount of from 10 to 95% by weight of the total formed polymers, and then copolymerizing 3-methylbutene-1 and other α-olefin having from 2 to 12 carbon atoms to form a copolymer having a 3-methylbutene-1 content of from 40 to 90% by weight in an amount of from 5 to 90% by weight of the total formed polymers.

BEST MODE OF CARRYING OUT THE INVENTION

Now, the present invention will be described in further detail.

The first component (hereinafter referred to as component (a)) in the polymer composition of the present invention is a 3-methylbutene-1 homopolymer, or a copolymer of 3-methylbutene-1 with other α-olefin having from 2 to 12 carbon atoms, which has a 3-methylbutene-1 content of higher than 90% by weight. As such other α-olefin having from 2 to 12 carbon atoms in the copolymer, there may be mentioned ethylene, propylene, butene, hexene, 4-methylpentene-1, octene, styrene or vinylcyclohexane. These other α-olefins may be employed in combination of two or more, and may further contain a small amount of a polyene such as butadiene or isoprene. The method for copolymerization is preferably a so-called random copolymerization method. The 3-methylbutene-1 content in the copolymer is higher than 90% by weight, preferably at least 95% by weight. If the content is outside this range, the melting point of the composition tends to be low, and the features of the 3-methylbutene-1 polymer such as a high melting point and solvent resistance tend to be impaired, such being undesirable.

The proportion of component (a) in the composition is from 10 to 95% by weight, preferably from 20 to 90% by weight.

The second component (hereinafter referred to as component (b)) is a copolymer of 3-methylbutene-1 with other α-olefin having from 2 to 12 carbon atoms, which has a 3-methylbutene-1 content of from 40 to 90% by weight. Such other α-olefin is selected from those mentioned with respect to component (a). Such other α-olefins may be employed in combination of two or more, and may contain a small amount of a polyene such as butadine or isoprene. The method for copolymerization is preferably a so-called random copolymerization method. The 3-methylbutene-1 content in the copolymer is from 40 to 90% by weight. If the content is outside this range, no adequate improvement will be obtained in the stretchability or in the tear strength or the impact strength of the molded product.

The proportion of component (b) in the composition is selected within a range of from 5 to 90% by weight preferably from 10 to 80% by weight. If the proportion of component (b) is too low, no adequate improvement will be obtained in the stretchability or mechanical strength, and if the proportion is too high, the heat resistance or solvent resistance tends to be inferior.

In order to obtain a composition having a good balance of the heat resistance and solvent resistance and the mechanical strength, stretchability, etc., it is preferred either to reduce the proportion of component (b) and increase the α-olefin content in component (b), or to increase the proportion of component (b) and reduce the α-olefin content in component (b). Namely, it is preferred that the total amount of α-olefins other than 3-methylbutene-1 in the total composition is at most 20% by weight, more preferably at most 15% by weight.

There is no particular restriction as to the method for preparing the composition from components (a) and (b), and there may be employed a method of simply mixing powders or pellets of the two components, a method of mixing them in the form of a suitable solution, or a method of kneading them by a single-screw or double-screw extruder or by a Banbury mixer. However, it is preferred to employ a two-step polymerization method.

The two-step polymerization method will be explained. Firstly, component (a) is formed by polymerizing 3-methylbutene-1, or 3-methylbutene-1 and an α- olefin, in an aliphatic, alicyclic or aromatic hydrocarbon such as butane, hexane, heptane, cyclohexane or benzene, in a liquid olefin or without any solvent, in the presence of a transition metal compound and an organometallic compound of a metal of Groups 1 to 3 of the periodic table, and then component (b) is formed in the presence of component (a). If this order is reversed so that component (b) is formed first, the slurry properties of the final polymer is likely to deteriorate, such being undesirable. There is no particular restriction as to the transition metal compound and the organometallic compound of a metal of Groups 1 to 3 of the periodic table, as catalysts. There may be employed those which are commonly used for the polymerization of olefins. For instance, as the transition metal compound, a titanium compound such as a titanium halide or a titanium alkoxide may be mentioned, and as the organometallic compound, an organoaluminum compound such as a trialkylaluminum or an alkylalminum halide may be mentioned. Preferred is a combination of a solid catalyst component comprising Mg, Ti and an electron donative compound such as an ether or an ester, and an organoaluminum compound and optionally an electron donative compound such as an ether or an ester. Such a solid catalyst component is disclosed in, for instance, Japanese Unexamined Patent Publication Nos. 98076/1977, 24378/1978, 85877/1978, 117083/1978, 6204/1984 and 11306/1984. Particularly preferred is a combination of a solid titanium trichloride catalyst component containing a complexing agent and an organoaluminum compound, particularly a trialkylaluminum such as tri-n-propylaluminum or a dialkylaluminum monochloride, and optionally an electron donative compound such as an ether or an ester, in which the aluminum content is at most 0.15 by the atomic ratio of aluminum to titanium. Such a solid titanium trichloride catalyst component is disclosed in, for instance, Japanese Examined Patent Publication Nos. 8451/1980, 8452/1980, 8003/1980, 27871/1979, 39165/1980, 14054/1980 and 44958/1978.

The polymerization temperature is from 0° to 150° C. If necessary, a molecular weight controlling agent such as hydrogen may be employed.

The melting point of the polymer composition thus obtained, is at least 240° C., preferably at least 260° C. Further, the melt viscosity of each of component (a), component (b) and the 3-methylbutene-1 polymer composition comprising components (a) and (b), is selected within a range of from $1 \times 10^4$ to $1 \times 10^7$ poise, preferably from $5 \times 10^4$ to $5 \times 10^6$ poise as measured by a conical disc-type rotary rheometer at 330° C. and at a shear rate of 0.1 sec$^{-1}$, i.e. an angular velocity of 0.1 radian/sec.

The melt index (according to the method of measurement mentioned hereinafter) of the polymer composition is preferably from 0.1 to 100 ml/10 min.

The polymer composition may be used for molding films or other molded products, or as a base polymer for graft reactions, if necessary after an addition of a stabilizer, a metal poison-preventing agent, a flame retardant, an inorganic or organic filler, etc.

Now, Examples will be given, but it should be understood that the present invention is by no means restricted to the following Examples.

In the following Examples, the tensile test properties were measured in accordance with ASTM-D638, and the Elmendorf tear test was conducted in accordance with JIS P-8116. Further, the comonomer content was quantitatively analyzed by the infrared absorption spectrum measurement.

The melt index of the composition comprising components (a) and (b) was measured by using Flow Tester CFT500 Model manufactured by Shimadzu Corporation at 320° C. under a load of 10 kg after 6 minutes of preheating. The cross-sectional area of the piston was 1 cm, and the nozzle diameter was 2.008 mm. The measured value was indicated by a unit of ml/10 min.

PREPARATION EXAMPLE 1

(A) Preparation of a uniform solution of titanium trichloride

Into a four necked flask having a capacity of 500 ml flushed with dry argon, 150 ml of purified toluene and 90 mmol of titanium tetrachloride were charged, and 90 mmol of di-n-butyl ether was further added. Titanium tetrachloride and di-n-butyl ether were reacted with some heat generation and uniformly dissolved in toluene, whereby a uniform orange yellow solution was obtained. While maintaining the solution at 25° C. under stirring, a solution obtained by dissolving 45 mmol of diethylaluminum monochloride in 20 ml of toluene, was gradually added thereto, whereby a dark orange uniform solution of titanium trichloride was obtained.

(B) Formation of titanium trichloride precipitates and preparation of a catalyst The uniform solution of titanium trichloride obtained in the above step (A), was heated to 95° C. During the temperature rise, formation of purple titanium trichloride precipitates was observed. The solution was stirred at 95° C. for 60 minutes, and the precipitates were collected by filtration, and washed 5 times with 100 ml of n-heptane to obtain a fine particulate purple titanium trichloride catalyst complex. From the elemental analysis, this catalyst complex was found to have a composition of $TiCl_3(AlCl_3)_{0.004}[(nC_4H_9)_2O]_{0.05}$.

EXAMPLE 1

Into a thoroughly dried induction-stirring system autoclave having a capacity of 2 liters flushed with nitrogen gas, 9.8 mmol of diisobutyl aluminum monochloride and 630 g of liquefied 3-methylbutene-1 were charged. The internal temperature was raised to 70° C., and then 741 mg of the solid titanium trichloride catalyst component obtained in Preparation Example 1 was introduced under pressure of nigrogen gas, whereupon the polymerization of the first step was initiated. While maintaining the internal temperature at 70° C., homopolymerization of 3-methylbutene-1 was continued for one hour. Then, 2.1 g of butene-1 was introduced under pressure, whereupon the polymerization for the second step was initiated. The copolymerization of 3-methylbutene-1 with butene-1 was continued at 70° C. for 2.5 hours while intermittently introducing 2.1 g of n-butene-1 (total: 63 g) under pressure.

Then, unreacted monomers were purged, and 1000 ml of n-hexane containing 5% by volume of isobutanol, was charged, and stirred at 50° C. for 30 minutes. Then, the supernatant was withdrawn. This operation was repeated five times to wash off the catalyst component in the polymer, and then the polymer was dried to obtain 294 g of a 3-methylbutene-1 polymer composition as a white powder. The proportion of the second step polymer (component (b)) obtained from the analyses of catalysts in the polymers sampled in small amounts at the end of the first and second steps, was 63% by weight, and the butene-1 content in component (b) was 16% by weight. The melt index of the polymer composition thus obtained, was 10.0 ml/10 min, and the melt viscosity was $1.0 \times 10^5$ poise.

After an addition of 0.2% by weight of each of Irganox 1010 and Irgafos P-EPQ (both manufactured by Nippon Ciba Geigy Company) to the polymer composition thus obtained, the mixture was pelletized at 310° C. by an extruder. The melting point of the product was 296° C. Table 1 shows the results of the tensile test on the test pieces punched out from a pressed film having a thickness of 0.3 mm and the results of the Elmendorf tear test on the test pieces punched out from a pressed sheet having a thickness of 0.3 mm.

COMPARATIVE EXAMPLE 1

Into a thoroughly dried induction-stirring system autoclave having a capacity of 2 liters flushed with nigrogen gas, 9.8 mmol of diisobutyl aluminum monochloride and 600 g of liquefied 3-methylbutene-1 were charged. The internal temperature was raised to 70° C., and then 740 mg of the solid titanium trichloride catalyst component obtained in Preparation Example 1 was introduced under pressure of nigrogen gas, whereupon the polymerization was initiated. While maintaining the internal temperature at 70° C., homopolymerization of 3-methylbutene-1 was continued for 4 hours. Unreacted monomers were purged, and 1000 ml of n-hexane containing 5% by volume of isobutanol, was charged, and stirred at 50° C. for 30 minutes. Then, the supernatant was withdrawn. This operation was repeated five times to wash off the catalyst component in the polymer, and then the polymer was dried to obtain 250 g of a 3-methylbutene-1 polymer as a white powder. After the addition of the stabilizers, the same operation as in Example 1 was conducted, and the results of various tests are shown in Table 1.

COMPARATIVE EXAMPLES 2 AND 3

Into a thoroughly dried induction-stirring system autoclave having a capacity of 2 liters flushed with nigrogen gas, 9.8 mmol of diisobutyl aluminum monochloride and 600 g of liquefied 3-methylbutene-1 were charged. The internal temperature was raised to 70° C., and then 740 mg of the solid titanium trichloride catalyst component obtained in Preparation Example 1 was introduced under pressure of nigrogen gas, whereupon the polymerization was initiated. 0.7 g of butene-1 was immediately introduced under pressure, and thereafter, the copolymerization of 3-methylbutene-1 and butene-1 was continued at 70° C. for 4 hours while intermittently introducing 0.7 g (total: 32 g) of n-butene-1 under pressure (Comparative Example 2). In Comparative Example 3, the amount of n-butene-1 introduced was increased so that total was 48 g.

After purging unreacted monomers, 1000 ml of n-hexane containing 5% by volume of isobutanol, was charged, and the mixture was stirred at 50° C. for 30 minutes. Then, the supernatant was withdrawn. This operation was repeated five times to wash off the catalyst component in the polymer, and then the polymer was dried to obtain 260 g (Comparative Example 2) or 275 g (Comparative Example 3) of a 3-methylbutene-1 polymer composition as white powder. After the addition of the stabilizers, the same operation as in Example 1 was conducted, and the results of various tests are shown in Table 1.

EXAMPLES 2 TO 4

The operation was conducted in the same manner as in Example 1 except that the ratio of components (a) and (b) and the types and contents of comonomers were changed as shown in Table 1.

The results of various tests are shown in Table 1. Further, with respect to the polymer obtained in Example 2, the solvent resistance test was conducted. Namely, a test piece of 1 mm (thickness)×5 mm (width)×5 cm prepared by pressing, was immersed in 100 ml of toluene, and left at 23° C. for 7 days, and the weight increase immediately after the withdrawal was measured and found to be 15%.

No substantial change was observed on the outer appearance.

COMPARATIVE EXAMPLE 4

65 parts by weight of the poly 3-methylbutene-1 of Comparative Example 1 and 35 parts by weight of an ethylene-propylene rubber ($ML_{1+4}^{100° C.}=70$) having a propylene content of 25%, were kneaded and pelletized by a single screw extruder. The additives were similar to those in Example 2. From the pellets, a test piece of 1 mm (thickness)×5 mm (width)×5 cm was prepared by press molding. The test piece was immersed in toluene under the same condition as in Example 2, whereby the ethylene-propylene rubber dissolved and the original configuration was not maintained.

TABLE 1

| | Polymer of first step (component (a)) | | | | Polymer of second step (component (b)) | | | |
| --- | --- | --- | --- | --- | --- | --- | --- | --- |
| | | | Comonomer | | | | Comonomer | |
| | Content (wt. %) | Polymerization time (hr) | Type | Content (wt. %) | Content (wt. %) | Polymerization time (hr) | Type | Content (wt. %) |
| Example 1 | 37 | 1.0 | — | — | 63 | 2.5 | butene-1 | 16 |
| Example 2 | 65 | 2.0 | — | — | 35 | 1.5 | butene-1 | 25 |
| Example 3 | 80 | 2.75 | butene-1 | 3 | 20 | 0.75 | butene-1 | 50 |
| Example 4 | 35 | 1.0 | — | — | 65 | 2.7 | octene-1 | 18 |
| Comparative Example 1 | 100 | 4.0 | — | — | 0 | — | — | — |
| Comparative Example 2 | 100 | 4.0 | butene-1 | 6.7 | 0 | — | — | — |
| Comparative Example 3 | 100 | 4.0 | butene-1 | 14.7 | 0 | — | — | — |

| | Yield stress (20° C.) (kg/cm²) | Breaking extension (20° C.) (%) | Elmendorf tear strength (kg·cm/cm²) | Melting point (°C.) | Melt index (ml/10 min) | Melt viscosity (poise) |
| --- | --- | --- | --- | --- | --- | --- |
| Example 1 | 332 | 380 | 31 | 296 | 10.0 | $1.0 \times 10^5$ |
| Example 2 | 379 | 57 | 28 | 304 | 6.3 | — |
| Example 3 | 370 | 25 | 21 | 295 | 7.1 | $1.4 \times 10^5$ |
| Example 4 | 340 | 410 | 35 | 293 | 9.5 | — |

TABLE 1-continued

|  |  |  |  |  |  |  |
|---|---|---|---|---|---|---|
| Comparative Example 1 | 439 | 11 | 14 | 304 | 4.0 | $2.7 \times 10^5$ |
| Comparative Example 2 | 367 | 276 | 4.4 | 264 | 5.0 | — |
| Comparative Example 3 | 298 | 180 | 21 | 255 | 7.0 | — |

INDUSTRIAL APPLICABILITY

From the 3-methylbutene-1 polymer composition obtained by the process of the present invention, a film having excellent tear strength can be obtained, and a stretched film can readily be obtained since the stretchability is good. Further, it is possible to obtain a molded product having excellent rigidity and impact resistance. In addition to these properties, the films and molded products have excellent heat resistance, electric characteristics, chemical resistance, solvent resistance, moisture resistance and transparency, and they are useful for various packaging materials, insulating materials, print substrate materials, magnetic recording base films, etc.

I claim:

1. A 3-methylbutene-1 polymer composition comprising:
   (a) from 10 to 95% by weight of a 3-methylbutene-1 homopolymer, or a copolymer of 3-methylbutene-1 with other α-olefin having from 2 to 12 carbon atoms, which has a 3-methylbutene-1 content of higher than 90% by weight, and
   (b) from 5 to 90% by weight of a copolymer of 3-methylbutene-1 with other α-olefin having from 2 to 12 carbon atoms, which has a 3-methylbutene-1 content of from 40 to 90% by weight.

2. A process for producing a 3-methylbutene-1 polymer composition which comprises:
   in the presence of a transition metal compound and an organometallic compound of a metal of Groups 1 to 3 of the periodic table,
   (a) polymerizing 3-methylbutene-1, or 3-methylbutene-1 and other α-olefin having from 2 to 12 carbon atoms, to form a polymer or copolymer having a 3-methylbutene-1 content of higher than 90% by weight in an amount of from 10 to 95% by weight of the total formed polymers, and then
   (b) copolymerizing 3-methylbutene-1 and other α-olefin having from 2 to 12 carbon atoms to form a copolymer having a 3-methylbutene-1 content of from 40 to 90% by weight in an amount of from 5 to 90% by weight of the total formed polymers.

3. The process for producing a 3-methylbutene-1 polymer composition according to claim 2, wherein the transition metal compound is a titanium compound, and the organometallic compound is a trialkylaluminum or a dialkylaluminum monohalide.

4. The process for producing a 3-methylbutene-1 polymer composition according to claim 3, wherein the titanium compound is a solid titanium trichloride having an aluminum content being at most 0.15 by the atomic ratio of aluminum to titanium and containing a complexing agent.

5. The process for producing a 3-methylbutene-1 polymer composition according to any one of claims 2 to 4, wherein the polymerization in step (a) is homopolymerization of 3-methylbutene-1, and the copolymerization in subsequent step (b) is copolymerization of 3-methylbutene-1 with butene-1 or octene-1.

6. The process for producing a 3-methylbutene-1 polymer composition according to any one of claims 2 to 4 wherein the polymerization in each of steps (a) and (b) is copolymerization of 3-methylbutene-1 with butene-1.

7. The process for producing a 3-methylbutene-1 polymer composition according to claim 2, wherein the obtained polymer composition has a melt viscosity of from $1 \times 10^4$ to $1 \times 10^7$ poise as measured by a conical disc-type rotary rheometer at 330° C. and at a shear rate of 0.1 sec$^{-1}$ i.e. an angular velocity of 0.1 radian/sec.

* * * * *